US007237566B2

(12) United States Patent
Till

(10) Patent No.: US 7,237,566 B2
(45) Date of Patent: Jul. 3, 2007

(54) DEVICE AND CLEANING AND/OR DISINFECTING A KEG COUPLER

(75) Inventor: Rudolf Till, Lauf-Aubach (DE)

(73) Assignee: Sparkasse Buehl, Buehl (DE)

( * ) Notice: Subject to any disclaimer, the term of this patent is extended or adjusted under 35 U.S.C. 154(b) by 0 days.

(21) Appl. No.: 11/480,209

(22) Filed: Jun. 30, 2006

(65) Prior Publication Data

US 2007/0017574 A1 Jan. 25, 2007

Related U.S. Application Data

(63) Continuation of application No. PCT/EP2004/014260, filed on Dec. 15, 2004.

(30) Foreign Application Priority Data

Dec. 30, 2003 (DE) ................................ 103 61 865

(51) Int. Cl.
*F16K 51/00* (2006.01)

(52) U.S. Cl. ....................................... 137/240; 137/798

(58) Field of Classification Search ................ 137/240, 137/798

See application file for complete search history.

(56) References Cited

U.S. PATENT DOCUMENTS

| | | | | |
|---|---|---|---|---|
| 3,389,716 A * | 6/1968 | Wilbum | | 137/240 |
| 5,343,907 A | 9/1994 | Wagner | | |
| 5,479,955 A * | 1/1996 | Roodvoets et al. | | 137/240 |
| 5,503,179 A * | 4/1996 | Till | | 137/240 |
| 5,535,923 A * | 7/1996 | Fujioka | | 137/240 |
| 5,657,911 A * | 8/1997 | Mogler et al. | | 222/400.7 |
| 6,305,441 B1 * | 10/2001 | Till | | 137/240 |

FOREIGN PATENT DOCUMENTS

| | | |
|---|---|---|
| DE | G 91 13 488.9 | 3/1992 |
| DE | G 92 09 690.5 | 11/1992 |
| DE | 195 49 212 A1 | 7/1997 |

* cited by examiner

*Primary Examiner*—Kevin Lee
(74) *Attorney, Agent, or Firm*—Harness, Dickey & Pierce, P.L.C.

(57) ABSTRACT

The invention relates to a device which is used for cleaning and/or disinfecting a keg coupler (10) which has a collar-like lower section (14) with segment-like projections (18). The lower section (14) is provided on its periphery with a cylindrical external peripheral surface (16) and is provided on the inside with a recess which is formed by an axially recessed radial bearing surface (19), a cylindrical internal peripheral surface (20), a lower radial surface (21), and a peripheral surface (22) divided into segments. An adapter (30) can be fitted onto the keg coupler (10). The adapter (30) comprises an applying unit adapted to apply a cleaning liquid to a surface of the recess. The adapter (30) comprises an annular sealing insert (60), into which the keg coupler (10) can initially be fitted with the cylindrical external peripheral surface (16) in a loose state in a first operating position and can then be sealed in a liquid-tight manner in a second operating position, in such a way that a cavity (94) is formed which is delimited at least by the radial bearing surface (19), the cylindrical internal peripheral surface, the lower radial surface (21), the peripheral surface (22) divided into segments, and a surface (88) of the adapter (30).

20 Claims, 3 Drawing Sheets

DEVICE AND CLEANING AND/OR DISINFECTING A KEG COUPLER

CROSS REFERENCES TO RELATED APPLICATIONS

This application is a continuation of copending international patent application PCT/EP2004/014260 filed on Dec. 15, 2004 and designating the U.S., which claims priority of German patent application DE 103 61 865, filed on Dec. 30, 2003.

FIELD OF THE INVENTION

The invention relates to a device for cleaning and/or disinfecting a keg coupler which has a collar-like lower section with segment-like projections, the lower section being provided on its periphery with a cylindrical external peripheral surface and being provided on the inside with a recess which is formed by an axially recessed radial bearing surface, a cylindrical internal peripheral surface, a lower radial surface, and a peripheral surface divided into segments, and with an adapter onto which the keg coupler can be fitted, the adapter comprising an cleaning liquid applying unit adapted to apply a cleaning liquid to a surface of the recess.

BACKGROUND OF THE INVENTION

Devices of the abovementioned kind are known, for example from DE 198 49 153 A1.

Other cleaning devices are disclosed e.g. in DE 195 49 212 A1, DE 91 13 488 U1, DE 92 09 690 U1 or U.S. Pat. No. 5,343,907.

In dispensing systems for beverages, in particular carbonated beverages, it is necessary for hygiene reasons to clean the dispensing system at regular intervals. This cleaning not only involves cleaning the tap, which is usually located in the area of a bar counter in a pub or restaurant, and cleaning the beverage conduit leading to the cellar. Instead, it is also necessary to clean the keg coupler on those surfaces that may come into contact with the beverage.

Keg couplers are of a standardized design on their bottom surface so that, when connecting up a new keg, they can be mounted onto a complementary and also standardized fitting of the keg, and they can be removed from this fitting again upon disconnection of the keg. The actual contact surface of the keg coupler is a radial bearing surface which is mounted onto a corresponding mating surface of the keg fitting, so that the beverage conduit is connected to the riser pipe of the keg.

To fix the coupler on the keg fitting, a bayonet-like arrangement is used which is made up of a cylindrical internal peripheral surface, a lower radial surface, and segmented peripheral surfaces that protrude inward about the circumference. When connecting up a keg, the segments are inserted from above into corresponding recesses of the keg fitting. The keg coupler is then turned about a common axis of keg coupler and keg fitting, so that the segments then extend under corresponding mating segments of the keg fitting and are wedged in place there.

The connecting operation is then effected by pivoting a lever located on the keg coupler. This establishes the connection between a riser pipe of the keg and the beverage conduit leading to a taproom. The pivoting of the lever also opens the gas conduit, so that carrier gas ($CO_2$) can flow into the keg.

Upon connection and disconnection of a keg, it is primarily the radial bearing surface of the keg coupler that comes into contact with the beverage.

In conventional devices of the type mentioned at the outset, the keg coupler is mounted onto the spatially fixed adapter, which in principle is designed as a keg fitting, but instead of having a riser pipe comprises a tubular conduit through which a cleaning liquid can be conveyed. Because conventional cleaning adapters of this kind simulate a connecting of the keg coupler, the gas conduit for the carrier gas has to be shut off before the keg coupler is connected to the cleaning adapter, since otherwise the carrier gas would emerge in an uncontrolled manner.

It should be noted at this point that, in the context of the present application, "cleaning" is to be understood as meaning all processes that can be initiated in connection with a cleaning operation, for example also disinfection, flushing and the like.

Conventional devices of the type mentioned at the outset are now designed such that, during the cleaning on the adapter, only the radial bearing surface is cleaned because, as has been mentioned, when the keg coupler is mounted onto the cleaning adapter, only the connecting process is simulated. Therefore, in conventional cleaning adapters of this kind, only those surfaces and cavities can be cleaned that are also accessible in the connected state of the keg coupler. There is no access, however, to those surfaces which, in contrast to the connected state, cannot be reached through shutting off the gas conduit.

In practice, however, this form of cleaning has not always proven satisfactory under certain operating conditions. This is because, during connection and disconnection of a keg, traces of the beverage may reach the other surfaces of the keg coupler which serve to connect the keg coupler to the keg fitting, that is to say the cylindrical internal peripheral surface, the lower radial surface, and the segmented peripheral surface. These last-mentioned surfaces are not cleaned by conventional devices.

Moreover, even quite negligible traces, for example droplets of beverage, for instance beer, that settle on these surfaces can lead to hygiene problems, especially if the keg is located in a relatively warm environment, for example during the warm season.

SUMMARY OF THE INVENTION

The object of the invention is to develop a device of the type mentioned at the outset such that these disadvantages are avoided. In particular, a device is to be made available in which all surfaces of the keg coupler that may come into contact with the beverage can be effectively cleaned.

According to the invention, this object is achieved by the fact that the adapter comprises an annular sealing insert, into which the keg coupler can initially be fitted with the cylindrical external peripheral surface in a loose state in a first operating position and can then be sealed in a liquid-tight manner in a second operating position, in such a way that a cavity is formed which is delimited at least by the radial bearing surface, the cylindrical internal peripheral surface, the lower radial surface, the peripheral surface divided into segments, and a surface of the adapter, and that the first means are connected to the cavity.

The object of the invention is achieved in full in this way.

By virtue of the fact that all the surfaces of the keg coupler which may come into contact with the beverage form surface sections of a cavity that is sealed in a liquid-tight manner, simple cleaning of all the aforementioned surfaces is made possible by introducing a cleaning liquid into this cavity. Therefore, in contrast to known devices, the keg coupler does not have any surfaces that may still have beverage residues on them and that may thus constitute a hygiene problem.

The main reason for this is that the connecting of a keg is not simulated in the device according to the invention. The keg coupler is not in fact mounted and secured on the cleaning adapter by a pivoting of the lever. Instead, this is done only by axial fitting and turning. In contrast to conventional cleaning adapters, therefore, the gas conduit for the carrier gas does not have to be shut off.

In a preferred embodiment of the device according to the invention, the keg coupler can be fitted in a manner known per se into the first operating position in the adapter in the direction of a common axis and, by turning the keg coupler relative to the adapter about the axis, can be locked onto the adapter in the second operating position.

This measure has the advantage that the user can establish a connection between keg coupler and adapter using the maneuvers that are familiar to him.

In this case it is also preferable if second means are provided for pressing the sealing insert radially inward against the cylindrical external peripheral surface during the relative turning of the keg coupler and of the adapter.

This measure has the advantage that the required sealing of the cavity can be produced directly by the normal turning of the keg coupler relative to the adapter.

In a particularly preferred configuration of the aforementioned illustrative embodiment, the adapter has an inner part which is substantially spatially fixed when used in the intended manner, and a housing part which is movable relative to the inner part and engages around the sealing insert with a coaxial internal peripheral surface, which inner part axially fixes the sealing insert, and the internal peripheral surface of the housing part merges into a conical taper, and, finally, the second means effect a movement of the housing part relative to the inner part in the direction of the axis.

This measure has the advantage that the turning movement of the keg coupler relative to the adapter is converted in a structurally simple manner into an axial movement which, via a wedge surface, leads to a compression of the sealing insert and thus to the liquid-tight closure of the cavity.

In a further development of said illustrative embodiment, this is preferably achieved by the fact that the second means comprise a wedge mechanism which acts in the axial direction on the housing part during the relative turning of the keg coupler and of the adapter.

This measure has the advantage that the desired sequence of movement can be obtained with what are mechanically extremely simple elements, which also function reliably for considerable periods of time under the rough conditions of use in pubs and restaurants and the like.

The wedge mechanism is preferably arranged between the inner part and the housing part.

In further preferred variants of the illustrative embodiment, the inner part is elastically tensioned relative to the housing part.

This measure has the advantage that the parts of the adapter that are moved in the transition from the first operating position to the second operating position return automatically to their starting position when the connection between keg coupler and adapter is released.

In a preferred development of this variant, the housing part is less tensioned relative to the inner part in the first operating position and is more tensioned relative to the inner part in the second operating position.

This measure has the advantage that, even in the rest position, i.e. in the first operating position of the adapter, there are already defined relations in terms of the position of the movable parts of the adapter, because these are pretensioned in a defined starting position.

The inner part is preferably tensioned relative to the housing part by means of an axially disposed spring.

This measure has the advantage that, by using a very simple mechanical element, it is again possible to ensure a reliable function under rough conditions of use, with the added advantage of only minimal production costs.

A particularly good effect is achieved if the inner part comprises the surface partially delimiting the cavity, and, further, the first means include a first channel which opens into the surface, and, finally, the cleaning liquid can be introduced into the first channel.

This measure has the advantage that the cavity can be supplied with cleaning liquid in what is a structurally simple manner.

This applies especially if, in a further development of this illustrative embodiment, the first means additionally include a second channel and a valve, the first channel being connected via the second channel to a delivery means for the cleaning liquid, and the valve being arranged between the first channel and the second channel.

This measure has the advantage that the delivery of the cleaning agent inside the adapter can be regulated by a valve integrated in the latter.

A particularly good effect is achieved in this case by the fact that, as a result of the keg coupler being turned relative to the adapter, the valve can be switched from a closure position, assigned to the first operating position, into an open position, assigned to the second operating position.

This measure has the advantage that the delivery of cleaning liquid takes place automatically by means of the keg coupler being mounted on the adapter and locked there, while on the other hand the delivery of cleaning liquid is then automatically switched off again when the keg coupler is removed from the adapter.

In one configuration of this illustrative embodiment, in order to actuate the valve, an actuation element is provided which at one end bears on the valve and at the other end bears on an inclined peripheral surface of the housing part.

This measure has the advantage that the desired actuation of the valve is again effected here by means of a simple wedge mechanism.

In further embodiments of the invention, the inner part is fixedly connected to a bottom part which is substantially spatially fixed when used in the intended manner, a tubular extension piece of the inner part being fitted into the bottom part, and a further channel connected to the first channel runs through the extension piece, and a pipe conduit is guided at an angle through the bottom part and through the extension piece, its interior being connected to the further channel.

This measure has the advantage that the elements of the adapter that are spatially fixed when used in the intended manner can be designed in a structurally simple way and can be fixed relative to one another by simple plugging together.

This applies especially when the further channel is the second channel.

In a preferred development of the abovementioned illustrative embodiment, the pipe conduit passes diametrically through the bottom part and is accessible at both ends.

This measure has the advantage that the device according to the invention can be used for dispensing systems comprising several keg couplers, because the pipe conduit can then form a section of a common supply line for the cleaning liquid. Several adapters are then arranged alongside one another on a common bench, expediently in direct proximity to the associated kegs. Each keg coupler of each keg can then be moved to its associated adapter and cleaned there.

If, in another preferred configuration of this illustrative embodiment, the pipe conduit is made up of several parts in the axial sense, the assembly of the adapter is further simplified.

Further advantages will become evident from the description and from the attached drawing.

It will be appreciated that the aforementioned features and the features still to be explained below can be used not only in the respectively cited combination, but also in other combinations or singly, without departing from the scope of the present invention

BRIEF DESCRIPTION OF THE FIGURES

Illustrative embodiments of the invention are explained in more detail in the following description with reference to the drawing, in which.

DESCRIPTION OF PREFERRED EMBODIMENTS

Figures 1A, 1B:
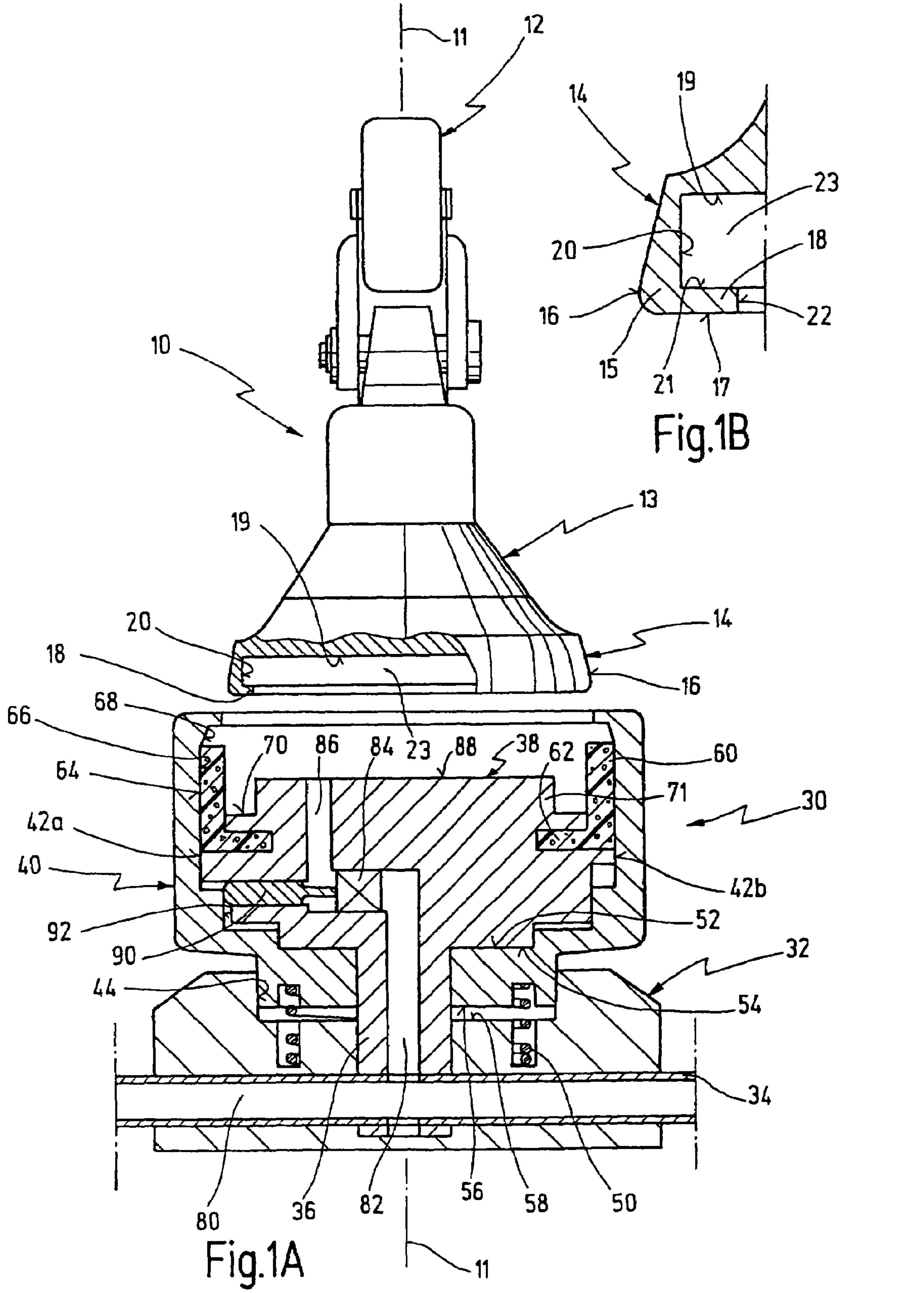
FIG. 1A shows a side view, partially in cross section, of an illustrative embodiment of a device according to the invention in a starting position.
FIG. 1B shows a detail from FIG. 1A on an enlarged scale, depicting a lower section of a commercially available keg coupler.

In FIG. 1A, a keg coupler of a commercially standard design is designated overall by 10. The keg coupler 10 has an axis 11 which, when the keg coupler 10 is used in the intended manner, is a vertical axis. At the top of the keg coupler 10, there is a lever system 12 with which the keg coupler 10 is actuated upon connection and disconnection of a keg, i.e. it can be connected to a keg fitting or removed from this. A beverage conduit 8 leading to a tap in a taproom (not shown) and a gas conduit 9 for a carrier gas ($CO_2$) can be seen in the side view in FIG. 3.

At the bottom, the keg coupler 10 has a conical section 13 which is adjoined at its bottom by a lower section 14. This lower section 14 is primarily provided for the connection to a keg fitting or, in the context of the present invention, for connection to a cleaning adapter.

As can be seen in particular from FIG. 1B, the lower section 14 is made up of a collar-like extension 15 which is externally delimited by a cylindrical external peripheral surface or line. On the underside there is a radial end face 17, which is formed partially by segment-like projections 18. These protrude radially inward from the underside of the collar-like extension 15, but only in some areas round the periphery of the extension 15.

A recess 23 formed in this way on the underside of the keg coupler 10 is formed by an axially recessed radial bearing surface 19, a cylindrical internal peripheral surface 20 and a lower radial surface 21 which corresponds to the top face of the segment-like projections 18. The latter form radially inward a further peripheral surface 22.

In conventional keg couplers of this kind, the beverage conduit (not shown) opens out in the axial direction in the radial bearing surface 19. This is placed onto the keg fitting upon connection of a keg, with the beverage conduit then coming into communication with the riser conduit of the keg. The radial bearing surface 19 is therefore that area of the keg coupler 10 which most likely comes into contact with the beverage. Customary cleaning devices or cleaning adapters are therefore limited to cleaning only this radial bearing surface 19.

It should also be pointed out at this juncture that "cleaning" is of course also to be understood in the present contexts as meaning processes such as flushing and disinfecting.

Whereas the keg coupler 10 is of conventional design, a disinfection adapter 30 is described below which, in accordance with the invention, differs from the prior art.

The disinfection adapter 30 according to FIG. 1A comprises a bottom part 32 which is generally mounted in a spatially fixed manner. As will be explained below, in the case of quite large dispensing systems comprising several kegs arranged alongside one another, it is particularly preferable to correspondingly arrange several disinfection adapters 30 alongside one another, for example on a suitably dimensioned bench.

For this purpose, a pipe conduit 34 is provided which runs through the bottom part 32 in the radial direction relative to the axis 11. As is indicated by dot-and-dash lines, the pipe conduit 34 in FIG. 1A continues to the right and to the left, so that further disinfection adapters arranged alongside this one can be coupled in series with this pipe conduit 34.

The bottom part 32 comprises an axial bore into which a tubular extension piece 36 of an inner part 38 protrudes. The tubular extension piece 36 is provided at its lower end with a transverse bore through which the pipe conduit 34 is engaged. In this way, the bottom part 32 and the inner part 38 are connected to one another both in a rotationally fixed manner and an axially fixed manner. To simplify assembly, the pipe conduit 34 can in this case also be designed in several parts in the longitudinal direction.

Lying on the inner part 38 there is a sleeve-like housing part 40, as is indicated by external peripheral surfaces 42*a* and 42*b*. The housing 40 also runs axially in the bottom part 32, as is indicated by an internal peripheral surface 44. The housing part 40 is tensioned elastically relative to the bottom part 32 and to the rigidly connected inner part 38, specifically by means of a spring 50, which is arranged in corresponding annular grooves of the bottom part 32 and of the housing part 40. In the starting position shown in FIG. 1A, the spring 50 is relatively untensioned, so that a lower radial end face 52 of the housing part 40 bears on an upper radial end face 54 of the inner part 38. If the housing part 40, however, is pressed downward counter to the force of the spring 50 (cf. description of FIG. 3 below), a lower radial end face 56 of the housing part 40 finally comes into abutment on an upper radial end face 58 of the bottom part 32. The housing part 40 is thus movable between two axial abutments, specifically counter to the force of the spring 50 and with the force of the spring 50.

In the upper area, the housing part 40 surrounds a sealing insert 60 which toward the top has the shape of a hollow cylinder and at the lower end has a radially inwardly pointing lower annular shoulder 62. With this annular shoulder 62, the sealing insert 60 is held in an axially fixed but rotatable manner in the inner part 38. An external peripheral surface 64 of the sealing insert 60 bears with a form fit via an axial toothing or with friction on a complementary internal peripheral surface 66 of the housing part 40. The surfaces 64, 66 are substantially cylindrical. However, the internal peripheral surface 66 of the housing part 40 merges toward the top into a conical taper 68 into which the upper end of the sealing insert 60 does not extend in the basic position according to FIG. 1A.

On its top face, the inner part 38 has an annular bearing surface 70 which extends around a central projection 71. The upper radial end face thereof is designated by 88.

The cleaning agent is delivered to the disinfection adapter 30 via an inner space 80 of the pipe conduit 34. The inner space 80 communicates with a first axial channel 82 in the tubular extension piece 36. This bends through 90° at its upper end and leads there to a valve 84 which, on its opposite face, is connected to a second channel 86 that once again extends axially upward. This second axial channel 86 opens out in the upper radial end face 88.

The valve 84 can be switched by means of an actuation element 90 whose rear end bears on an inclined peripheral surface 92 of the housing part 40. The actuation element 90 is therefore displaced in the radial direction when the housing part 40 is turned.

Figure 2:
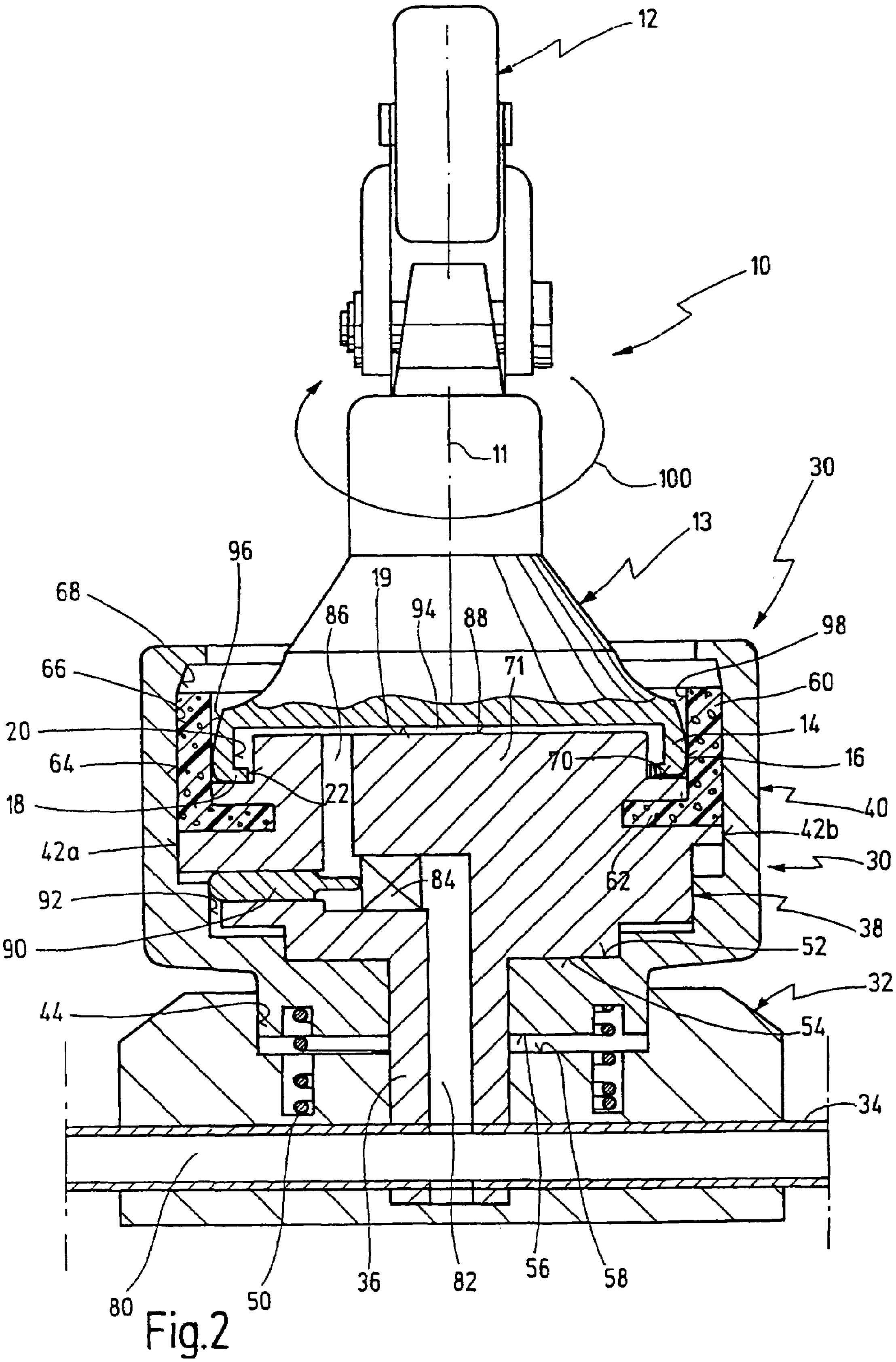
FIG. 2 shows the arrangement from FIG. 1A on a slightly enlarged scale compared to FIG. 1A, but in a first operating position of the device according to the invention.

The mode of operation of the device according to FIG. 1A and FIG. 1B will now be explained with reference to FIG. 2 (first operating position) and FIG. 3 (second operating position):

FIG. 2 shows that the keg coupler 10 has been inserted from the top downward in the direction of the axis 11 into the sealing insert 60 initially in a loose state, until the radial end face 17 of the segment-like projections 18 sits on the annular bearing surface 70 of the inner part 38. The cylindrical external peripheral surface or line 16 slides with friction along an internal peripheral surface 98 of the sealing insert 60.

In the position shown in FIG. 2, a cavity 94 has thus been formed which is delimited by the radial bearing surface 19, the cylindrical internal peripheral surface 20, the lower radial surface 21 and the peripheral surface 22 of the keg coupler 10, and also by the annular bearing surface 70 and external periphery and the radial end face 88 of the central projection 71. This cavity 94 is delimited by those surfaces 19, 20, 21 and 22 of the keg coupler 10 which are of interest in the present context and which are to be taken into consideration for cleaning.

In order to seal this cavity 94 now in a liquid-tight manner, the keg coupler 10 is turned about the axis 11, as is indicated by an arrow 100 in FIG. 2. This turning is preferably through 90°. This turning has the following effect:

By means of the frictional connection or a suitable form-fit connection between the cylindrical external peripheral surface 16 of the extension piece 15 of the keg coupler 10 and the internal peripheral surface 98 of the sealing insert 60, this sealing insert 60 is entrained when the keg coupler 10 is turned. The lower annular shoulder 62 of the sealing insert 60 slides in the receiving annular groove of the inner part 38. As a result of the similarly existing form-fit connection or frictional connection between the external peripheral surface 64 of the sealing insert 60 and the internal peripheral surface 66 of the housing part 40, the latter is also entrained in a turning movement of the keg coupler 10. Consequently, the keg coupler 10, the sealing insert 60 and the housing part 40 turn along with one another in this phase.

Where the term "frictional connection" is mentioned in this context, this, as has already been mentioned, is to be understood as meaning rough surfaces bearing against one another, and also as a toothed engagement or other kind of form-fit connection.

Figure 3:
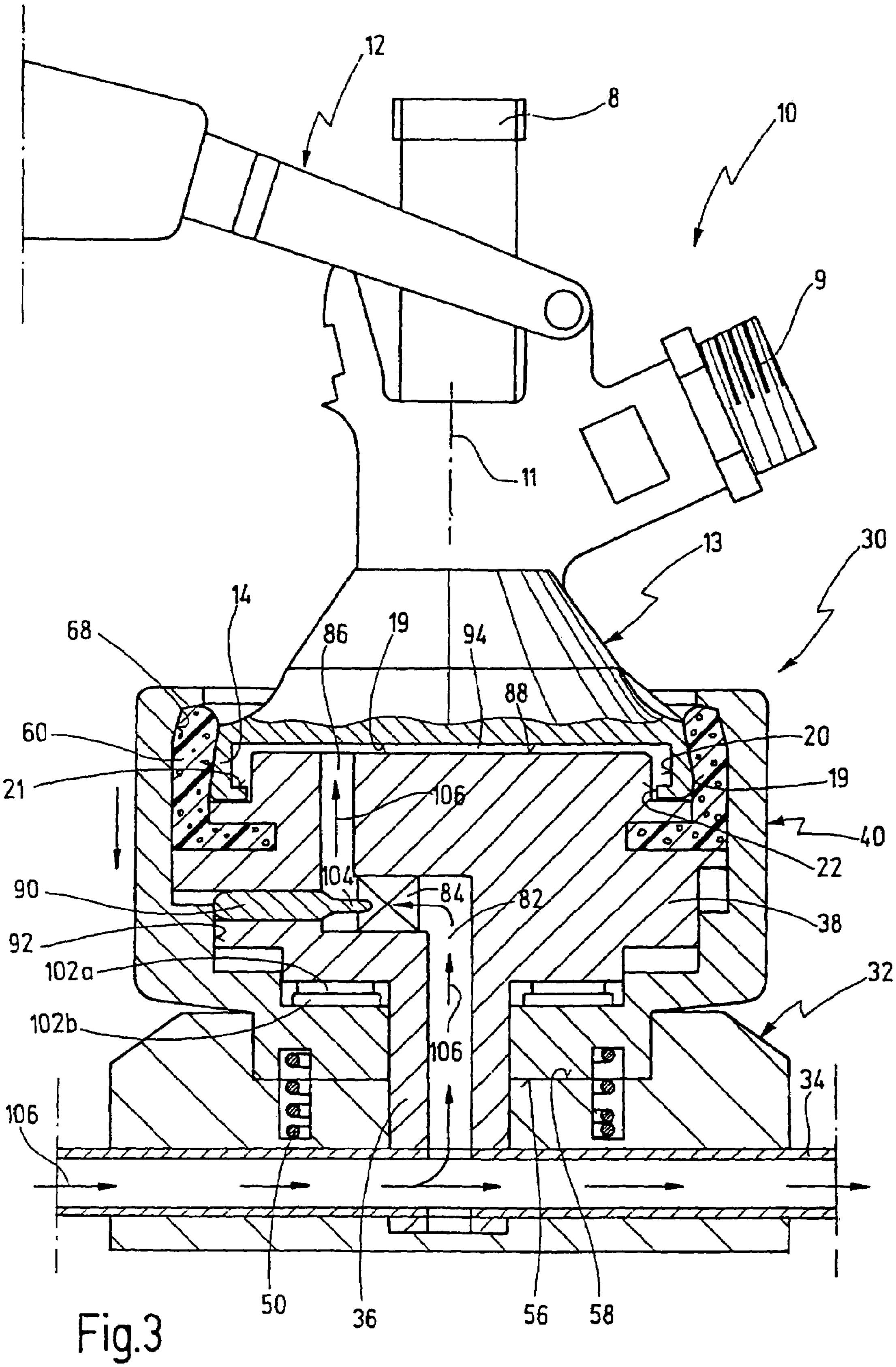
FIG. 3 shows a view as in FIG. 2, but for a second operating position of the device according to the invention.

FIG. 3 shows that between the housing part 40 and the inner part 38 there are wedge surfaces 102*a*, 102*b*, which are preferably located on the periphery of the tubular extension piece 36. These wedge surfaces 102*a*, 102*b* are formed in a screw configuration about the axis 11. They have the effect that the housing part 40, upon turning about the axis 11, moves downward relative to the inner part 38 and thus also relative to the bottom part 32, and specifically counter to the force of the spring 50. This turning movement continues until the abutment 56/58 already mentioned above is reached. In the case of an axial toothing between sealing insert 60 and housing part 40, the housing part 40 thus runs axially downward in this toothing, while the sealing insert 60 is axially fixed.

This axial downward movement of the housing part 40 has two effects:

First, the sealing insert 60 slides upward with its external peripheral surface 64 on the internal peripheral surface 66 of the housing part 40 until the upper end of the sealing insert 60 runs onto the conical taper 68. In this way, the upper part of the sealing insert 60 is pressed firmly against the external peripheral surface of the collar-like extension piece 15, with the result that the cavity 94 is closed in a liquid-tight manner.

Second, the axial downward movement of the housing part 40 has the effect that the rear end of the actuation element 90 runs along the inclined peripheral surface 92 and the actuation element 90 is thus displaced to the right in FIG. 2 and FIG. 3. A lug 104 of the actuation element 90 then comes into engagement with the valve 84 and opens the latter. In other words, the valve 84, which has hitherto been closed, is now automatically opened when the keg coupler 10 is turned relative to the disinfection adapter 30. As is indicated by arrows 106, cleaning liquid can now flow through the pipe conduit 34, the first axial channel 82, the valve 84 and the second axial channel 86 into the cavity 94 and can clean the aforementioned surfaces 19, 20, 21 and 22 at the lower end of the keg coupler 10.

The cleaning agent can be released from the cavity 94 by means of a connection to the beverage conduit 8 being established. The tap at the other end of the beverage conduit is then opened, and a flushing medium (water) is delivered until all of the cleaning agent has been flushed out of the beverage conduit 8.

When the keg coupler 10 is now turned back from the second operating position according to FIG. 3 to the first operating position according to FIG. 2, the housing part 40 travels back upward via the wedge surfaces 102*a*, 102*b* and with the support of the spring 50. The valve 84 then closes again automatically, and the sealing insert 60 relaxes, such that the keg coupler 10 can be removed again from the disinfection adapter 30 without mechanical resistance.

It follows from the above description that the cleaning process on the adapter 30 takes place completely independently of any maneuvers for connection of the keg coupler 10. In particular, the lever system 12 does not have to be actuated to connect the keg coupler 10 to the disinfection adapter 30, and the gas conduit 9 does not have to be shut off.

The invention claimed is:

1. A device for cleaning and/or disinfecting a keg coupler which has a collar-like lower section with segment-like projections, the lower section being provided on its periphery with a cylindrical external peripheral surface and being provided on the inside with a recess which is formed by an axially recessed radial bearing surface, a cylindrical internal peripheral surface, a lower radial surface, and a peripheral surface divided into segments, and with an adapter onto which the keg coupler can be fitted, the adapter comprising a cleaning liquid applying unit adapted to apply a cleaning liquid to a surface of the recess, wherein the adapter comprises an annular sealing insert, into which the keg coupler can initially be fitted with the cylindrical external peripheral surface in a loose state in a first operating position and can then be sealed in a liquid-tight manner in a second operating position, in such a way that a cavity is formed which is delimited at least by the radial bearing surface, the cylindrical internal peripheral surface, the lower radial surface, the peripheral surface divided into segments, and a surface of the adapter, and wherein the applying unit is connected to the cavity.

2. The device as claimed in claim 1, wherein the keg coupler can be fitted into the first operating position in the adapter in the direction of a common axis and, by turning the keg coupler relative to the adapter about the axis, can be locked onto the adapter in the second operating position.

3. The device as claimed in claim 2, wherein second means are provided for pressing the sealing insert radially inward against the cylindrical external peripheral surface during the relative turning of the keg coupler and of the adapter.

4. The device as claimed in claim 3, wherein the adapter has an inner part which is substantially spatially fixed when used in the intended manner, and a housing part which is movable relative to the inner part and engages around the sealing insert with a coaxial internal peripheral surface, wherein the inner part axially fixes the sealing insert, wherein the internal peripheral surface of the housing part merges into a conical taper, and wherein the second means effect a movement of the housing part relative to the inner part in the direction of the axis.

5. The device as claimed in claim 4, wherein the second means comprise a wedge mechanism which acts in the axial direction on the housing part during the relative turning of the keg coupler and of the adapter.

6. The device as claimed in claim 5, wherein the wedge mechanism is arranged between the inner part and the housing part.

7. The device as claimed in claim 4, wherein the inner part is elastically tensioned relative to the housing part.

8. The device as claimed in claim 7, wherein the housing part is less tensioned relative to the inner part in the first operating position and is more tensioned relative to the inner part in the second operating position.

9. The device as claimed in claim 7, wherein the inner part is tensioned relative to the housing part by means of an axially disposed spring.

10. The device as claimed in claim 4, wherein the inner part comprises the surface partially delimiting the cavity wherein the applying unit includes a first channel which opens into the surface, and wherein the cleaning liquid can be introduced into the first channel.

11. The device as claimed in claim 10, wherein the applying unit additionally includes a second channel and a valve, wherein the first channel is connected via the second channel to a delivery means for the cleaning liquid, and wherein the valve is arranged between the first channel and the second channel.

12. The device as claimed in claim 11, wherein, as a result of the keg coupler being turned relative to the adapter, the valve can be switched from a closure position, assigned to the first operating position, into an open position, assigned to the second operating position.

13. The device as claimed in claim 12, wherein, in order to actuate the valve, an actuation element is provided which at one end bears on the valve and at the other end bears on an inclined peripheral surface of the housing part.

14. The device as claimed in claim 11, wherein the inner part is fixedly connected to a bottom part which is substantially spatially fixed when used in the intended manner, a tubular extension piece of the inner part being fitted into the bottom part, and a further channel connected to the first channel runs through the extension piece, and a pipe conduit is guided at an angle through the bottom part and through the extension piece, its interior being connected to the further channel.

15. The device as claimed in claim 11, wherein the further channel is the second channel.

16. The device as claimed in claim 14, wherein the pipe conduit passes diametrically through the bottom part and is accessible at both ends.

17. The device as claimed in claim 16, wherein, axially, the pipe conduit is made up of several parts.

18. The device as claimed in claim 7, wherein the housing part is less tensioned relative to the inner part in the first operating position and is more tensioned relative to the inner part in the second operating position.

19. The device as claimed in claim 11, wherein, as a result of the keg coupler being turned relative to the adapter, the valve can be switched from a closure position, assigned to the first operating position, into an open position, assigned to the second operating position.

20. The device as claimed in claim 14, wherein the further channel is the second channel.

* * * * *

UNITED STATES PATENT AND TRADEMARK OFFICE

CERTIFICATE OF CORRECTION

PATENT NO. : 7,237,566 B2
APPLICATION NO. : 11/480209
DATED : July 3, 2006
INVENTOR(S) : Rudolf Till It is certified that error appears in the above-identified patent and that said Letters Patent is hereby corrected as shown below:

Title Page,
Item [54] Title, "DEVICE AND CLEANING AND/OR DISINFECTING A KEG COUPLER" should be --DEVICE FOR CLEANING AND/OR DISINFECTING A KEG COUPLER--.

Item [56] References Cited, U.S. PATENT DOCUMENTS, "3,389,716", "Wilbum" should be --Wilburn--.

Item [56] References Cited, FOREIGN PATENT DOCUMENTS, insert the following:
-- DE 198 49 153 A1 4/2000 --.

Column 1,
Title, lines 1-2, "DEVICE AND CLEANING AND/OR DISINFECTING A KEG COUPLER" should be -- DEVICE FOR CLEANING AND/OR DISINFECTING A KEG COUPLER --.

Signed and Sealed this

Sixteenth Day of October, 2007

JON W. DUDAS

*Director of the United States Patent and Trademark Office*

UNITED STATES PATENT AND TRADEMARK OFFICE

CERTIFICATE OF CORRECTION

PATENT NO. : 7,237,566 B2
APPLICATION NO. : 11/480209
DATED : July 3, 2007
INVENTOR(S) : Rudolf Till It is certified that error appears in the above-identified patent and that said Letters Patent is hereby corrected as shown below:

Title Page,
Item [54] Title, "DEVICE AND CLEANING AND/OR DISINFECTING A KEG COUPLER" should be --DEVICE FOR CLEANING AND/OR DISINFECTING A KEG COUPLER--.

Item [56] References Cited, U.S. PATENT DOCUMENTS, "3,389,716", "Wilbum" should be --Wilburn--.

Item [56] References Cited, FOREIGN PATENT DOCUMENTS, insert the following:
-- DE 198 49 153 A1 4/2000 --.

Column 1,
Title, lines 1-2, "DEVICE AND CLEANING AND/OR DISINFECTING A KEG COUPLER" should be -- DEVICE FOR CLEANING AND/OR DISINFECTING A KEG COUPLER --.

This certificate supersedes Certificate of Correction issued October 16, 2007.

Signed and Sealed this

Thirteenth Day of November, 2007

JON W. DUDAS
*Director of the United States Patent and Trademark Office*